(12) United States Patent
Pether et al.

(10) Patent No.: US 6,801,925 B2
(45) Date of Patent: *Oct. 5, 2004

(54) BIT REDUCTION USING DITHER, ROUNDING AND ERROR FEEDBACK

(75) Inventors: David N. Pether, Wokingham (GB); Mark D. Richards, Reading (GB)

(73) Assignee: LSI Logic Corporation, Milpitas, CA (US)

(*) Notice: Subject to any disclaimer, the term of this patent is extended or adjusted under 35 U.S.C. 154(b) by 631 days.

This patent is subject to a terminal disclaimer.

(21) Appl. No.: 09/851,860

(22) Filed: May 9, 2001

(65) Prior Publication Data

US 2002/0087610 A1 Jul. 4, 2002

(51) Int. Cl.[7] .................................................. G06F 7/38
(52) U.S. Cl. .......................................... 708/550; 708/551
(58) Field of Search ................................ 708/550, 551, 708/496, 497, 306, 494; 345/599, 605; 348/574

(56) References Cited

U.S. PATENT DOCUMENTS 5,157,489 A    10/1992   Lowe
5,301,269 A  *  4/1994   Alcorn et al. ................ 345/599
5,329,475 A  *  7/1994   Juri et al. ..................... 708/551
5,734,369 A  *  3/1998   Priem et al. .................. 345/605
6,148,317 A  * 11/2000   Riddle et al. ................ 708/551

FOREIGN PATENT DOCUMENTS

EP    0620675    10/1994
GB    2222342    2/1990

* cited by examiner

Primary Examiner—Chuong Dinh Ngo
(74) Attorney, Agent, or Firm—Christopher P. Maiorana, P.C.

(57) ABSTRACT

A circuit for reducing the number of bits in a K bit value from K to N bits. The circuit generally comprises a first summing circuit, a control circuit, an error feedback circuit, a second summing circuit, and a processor. The first summing circuit may add an error offset value and the N+m MSB's of the K bit value to produce a result data value. The control circuit may generate a dither offset value. The error feedback circuit may receive m LSBs of the result data value and generate an error value in dependence on the m LSBs. The second summing circuit may add the dither offset value and the error value to provide the error offset value. The processor may selectively control generation of the dither offset value and the error value.

19 Claims, 7 Drawing Sheets

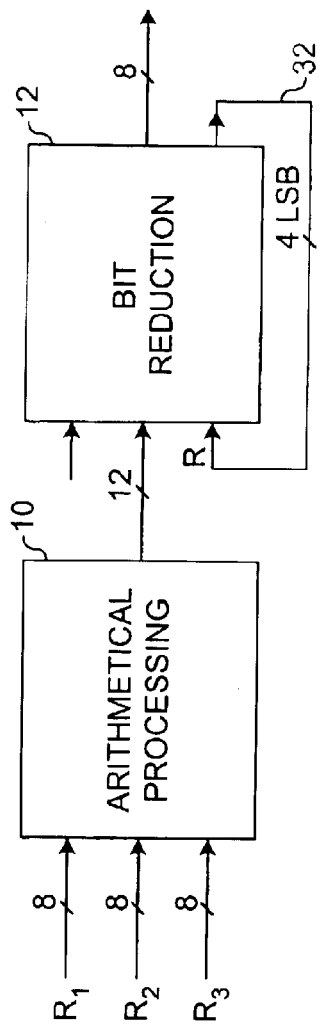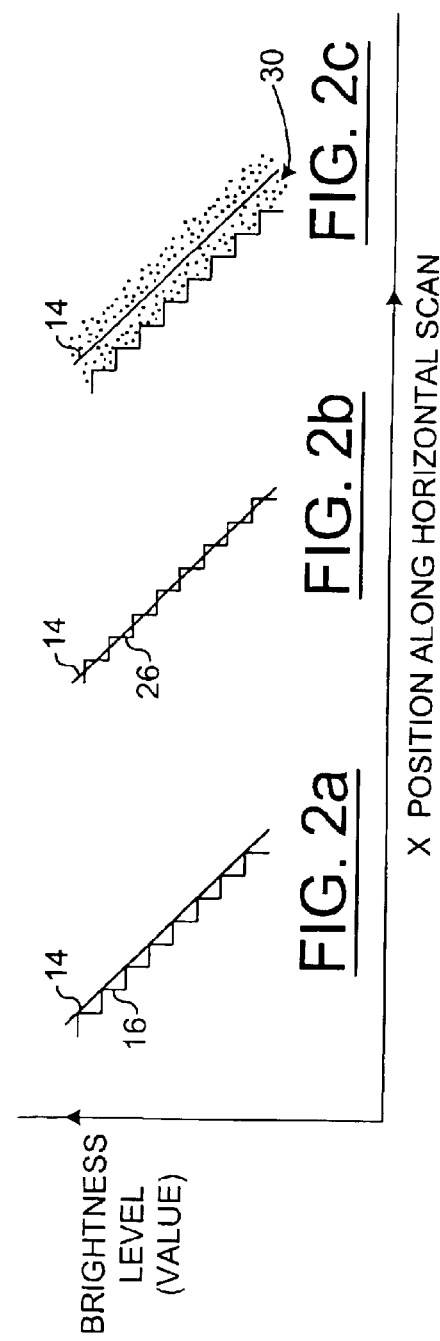

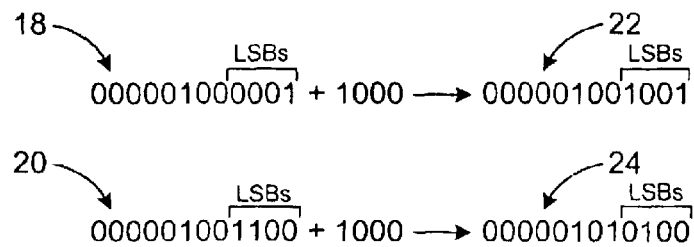
FIG. 3
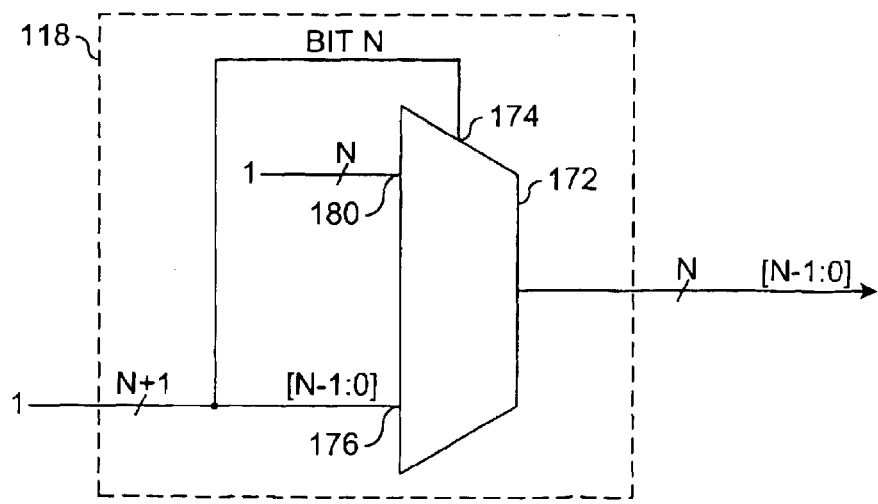
FIG. 4
FIG. 6

| CONCEALTYPE | Y[0] | X[0] | DITHER[1:0] |
|---|---|---|---|
| TRUNCATE | X | X | 00 |
| ROUND | X | X | 10 |
| DITHER | 0 | 0 | 01 |
| | 0 | 1 | 10 |
| | 1 | 0 | 10 |
| | 1 | 1 | 11 |

| | | | |
|---|---|---|---|
| 01 | 10 | 01 | 10 |
| 10 | 11 | 10 | 11 |
| 01 | 10 | 01 | 10 |
| 10 | 11 | 10 | 11 |

BIT REDUCTION USING DITHER, ROUNDING AND ERROR FEEDBACK

This application claims the benefit of United Kingdom Application No. 0031771.9, filed Dec. 29, 2000.

FIELD OF THE INVENTION

The present invention relates to data processing generally and, more particularly, data processing to reduce of the number of bits in a data word.

BACKGROUND OF THE INVENTION

In data processing operations, particularly those involving some form of arithmetic calculation, it is usually desirable to truncate the number in the calculation in order to reduce the number of bits used to represent the result. This is necessary since registers in a computer only hold numbers of a fixed length bits. Arithmetical operations on such numbers can result in a number which has more bits than allowable. The number must then be reduced for further processing. The Least Significant Bits (LSBs) of the data word or number are typically removed. When dealing with graphics or video data, the bit reduction process can lead to unsightly quantisation-type visual effects when the data is displayed on screen.

FIG. 1 shows a diagrammatic representation of the bit reduction process where three 9-bit data streams R1, R2, R3 are processed in a processing block 10 to produce a 12-bit output data stream R. The data stream R is then is reduced in a bit reduction circuit 12 to an 8-bit data stream.

One way to reduce the bits of the 12-bit data word R to 8-bits is to remove the four LSBs from the 12-bit number. This is known as truncation.

FIGS. 2(a), 2(b) and 2(c) are graphs of the brightness of an object across a screen display where the object dims from left to right on the screen. One example would be an object provided with a shadow. The effect of truncation on the object edge is illustrated in FIG. 2(a). The line 14 indicates the desired sharp edge and the line 16 represents the effect produced by truncation. This is, of course, greatly magnified in FIG. 2(a). However, the effect could still be discernable by the eye.

Various techniques have already been developed and are widely used in bit reduction to reduce the impact of these visual effects and these are discussed below. For example, when rounding, half of the maximum number which can be represented by the LSBs is added to the number to be rounded and then the LSBs are discarded.

FIG. 3 illustrates an example of rounding of two 12-bit numbers 18, 20 to which the number 1000 is added to give two new 12-bit numbers 22, 24. When the four LSBs of the new numbers 22, 24 are discarded, the result, in the case of number 18, is a number which is the same as the number which would have been generated by discarding the four LSBs of number 18. However, with the number 20 the result is a different 8-bit number. The effect of rounding is shown at 26 in FIG. 2(b) where the ideal object edge 14 is formed by the 12-bit number.

A dither process is similar to rounding but, instead of the offset being half the maximum possible value of the four LSBs, the offset for each data word representing each pixel is varied from pixel to pixel.

FIG. 4 is a diagrammatic representation of an array 28 of pixels in a rectangular region of the screen display with the coordinates for the pixel in the top left hand corner of the region being X, Y. The pixels in the rectangular block covered by coordinates X, Y to X+3, Y+1 represent the dimming edge of an object being drawn. In this example, the offset for the pixel at coordinate x, y would be one quarter of the maximum value of the four LSBs. Since the maximum value for the four LSBs is 1111, one quarter of this is 0100 and this offset value is shown in the x, y pixel coordinate of FIG. 4. For the pixel for the coordinate x+1, y the offset would be one half (1000) of the maximum value for the LSBs. Moving along the horizontal row of pixels the offset would alternate between one quarter and one half, as can be seen from FIG. 4. Then, for the next row the offset for the pixel coordinate x, y+1 would be one half (1000) and that for x+1, y+1 would be three quarters (1011), again alternating pixel by pixel along the x axis. Thus, the offsets are indicated in binary form in the pixel squares of FIG. 4. The effect of dithering is to "fuzz" the changes in brightness (pixel) values to reduce the visible effects of quantisation, as shown at 30 in FIG. 2(c).

Error feedback can be used with any of the above processes (i.e., truncation, rounding or dither). Error feedback is diagrammatically represented in FIG. 1 by the feedback path 32. Using error feedback, some or all of the discarded LSBs from a 12-bit word are fed back and added to the next 12-bit word before the LSBs of the next 12-bit word are discarded. Error feedback has the effect of providing a smearing of brightness errors along the object edge.

SUMMARY OF THE INVENTION

One aspect of the present invention provides a circuit for reducing the number of bits in a K bit value from K to N bits. The circuit generally comprises a first summing circuit, a control circuit, an error feedback circuit, a second summing circuit, and a processor. The first summing circuit may add an error offset value and the N+m MSB's of the K bit value to produce a result data value. The control circuit may generate a dither offset value. The error feedback circuit may receive m LSBs of the result data value and generate an error value in dependence on the m LSBs. The second summing circuit may add the dither offset value and the error value to provide the error offset value. The processor may selectively control generation of the dither offset value and the error value.

The present invention also provides a method of applying error concealment to the reduction of a data value, comprising the steps of (A) receiving a series of successive data values, (B) generating a respective error offset value for each of said data values and (C) adding each of said error offset values to a MSBs of the next following data value to produce a respective result value.

In one example, the K bit data value may be representative of a pixel data for display on a video display screen. The control circuit has a dither generating circuit for generating the dither offset value in dependence on n LSBs of each of the X and Y coordinates of the pixel data represented by the K bit data value.

The object, features and advantages of the present invention include a circuit which enables one or a combination of bit reduction techniques to be applied selectively to any video or graphics component

BRIEF DESCRIPTION OF THE DRAWINGS

These and other objects, features and advantages of the present invention will be apparent from the following detailed description and the appended claims and drawings in which:

FIG. 1 is a diagrammatic representation of a conventional bit reduction of a 12-bit number to an 8-bit number with error feedback;

FIGS. 2(a), 2(b) and 2(c) are diagrammatic representations of the effects of various conventional techniques of bit reduction on the edge sharpness of an object drawn on a display screen;

FIG. 3 is an illustration of bit reduction on a number using rounding;

FIG. 4 is a representation of bit reduction using dither;

FIG. 6 is a schematic representation of one form of limit circuit for the circuit of FIG. 5;

DETAILED DESCRIPTION OF THE PREFERRED EMBODIMENTS

Figure 5:
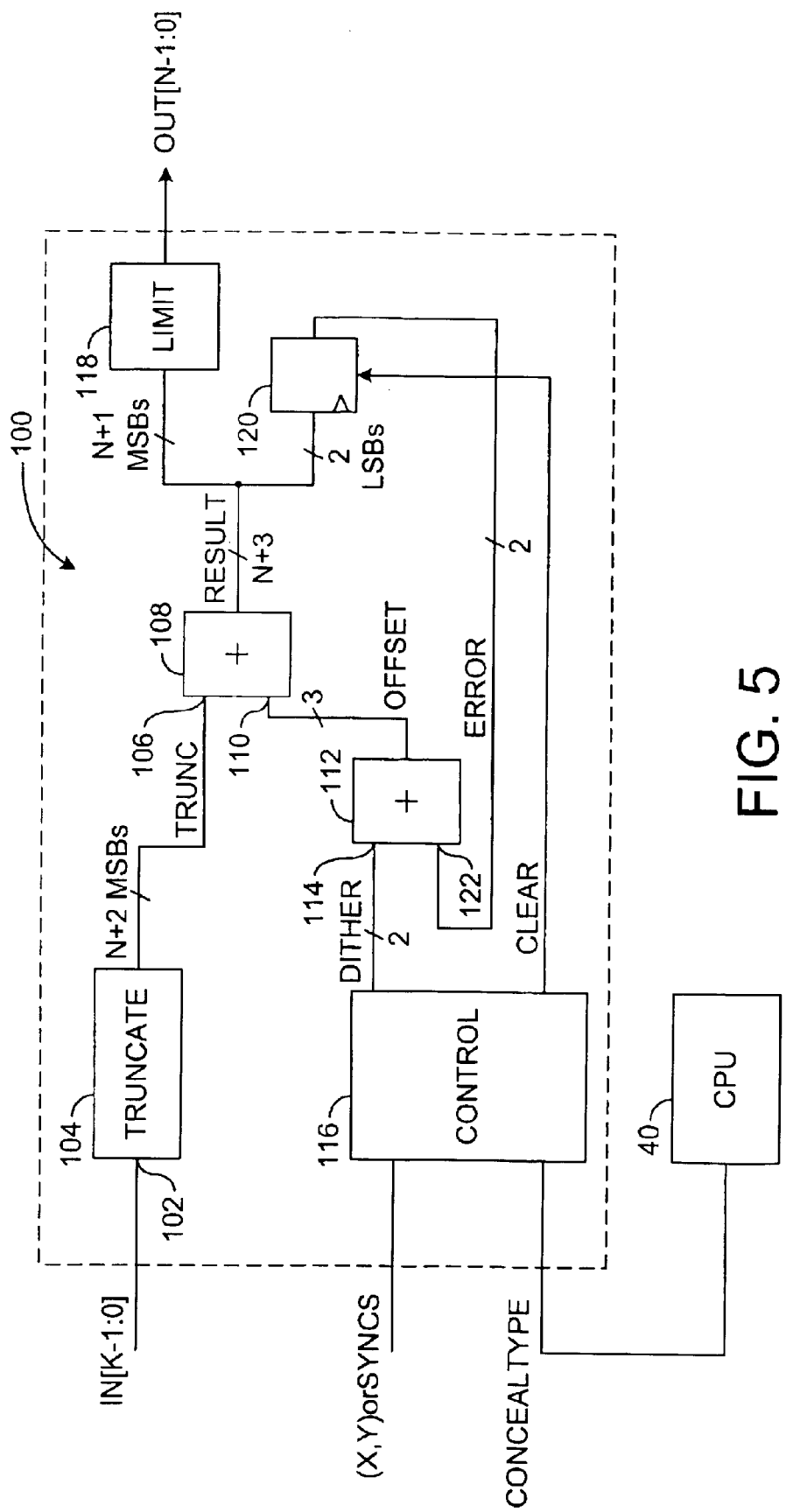
FIG. 5 is a schematic representation of bit reduction circuit according to a preferred embodiment of the present invention.

Referring now to FIG. 5, a circuit 100 is shown in accordance with a preferred embodiment of the present invention. The circuit 100 may reduce a data word having K bits down to a data word having N bits. In one example, where K=12, N=8 and M=2. However, the bit reduction described can be applied to other sizes of data words where at least a 2-bit reduction is required and M is 2 or more. The bit reduction of the circuit 100 may be applied to any video or graphics component such as the Red, Green, Blue, Luma, Alpha components. The circuit 100 enables a combination of truncation, rounding and dither, with or without error feedback, to be used for bit reduction of data words.

The circuit 100 has an input 102 for receiving each 12-bit word for bit reduction. Each data word has bits K–1:0 where, in this particular example, K is 12. The 12-bit word is truncated by removal of the two LSBs in a truncating process represented by 104 in FIG. 5. It will be appreciated that this simple truncation does not require any hardware to effect the truncation. The truncated data word comprises N+2 bits where, in this example, N is 8. The resulting truncated N+2 word is then fed to an input 106 of a summing circuit 108 which has a second input 110 connected to the output of a further summing circuit 112.

The summing circuit 112 has a first input 114 connected to a control block or circuit 116 which generates dither offset data bits. The output of the summing circuit 108 is applied both to a limit circuit 118 and to an error feedback register 120 whose output is in turn applied to a second input 122 of the summing circuit 112.

An error-concealing offset, which is a 3-bit word, is applied to the input 110 of the summing circuit 108 to be added to the N+2 bit word. The addition may overflow, depending on the expected range of the data signal being processed, with the result that the output of the summing circuit 108 may be a N+3 bit word. This N+3 word is applied to the limit circuit 118 in a further truncated form where the two LSBs are discarded, leaving N+1 bit word which is received by the limit circuit 118. The error feedback register 120 receives the two LSBs of the N+3 bit word from the summing circuit 108 and these are fed back to input 122 of the summing circuit 112 as a 2-bit error signal. The output is then combined with the 2-bit dither signal from the control circuit 116 by the summing circuit 112 to provide the 3-bit value for the error-concealing offset. The error-concealing offset signal is applied to input 110 of the summing circuit 108 for addition to the next N+2 bit word from the truncation process 104.

The control circuit 116 generates a "clear" signal between horizontal lines scanned on the display screen and between frames. The clear signal is applied to the error feedback register 120 to clear the register. The clear signal ensures that the error bits are not carried across between non-adjacent values of N+2 bit words applied to the summing circuit 108. The clear signal may be a single bit with a value of 0 or 1. One value, (e.g., 1) clears the register 120 to prevent feedback while the other value (e.g., 0) allows feedback. A microprocessor (CPU) 40 applies a concealment type signal to the control circuit to set the form of error concealment which is to be applied by the circuit 100 to the data value being processed. Where error feedback is to be inhibited, the CPU 40 simply latches the clear signal to the value which clears the register 120. Effectively the error value 00 is applied to the summing circuit 112.

The operation of the circuit of FIG. 5 is now described. The first stage in processing a K bit word down to N bits (assuming that K>(N+2)) is to discard those LSBs which are so insignificant that they would not be useful for error concealment. Where a N bit output from the circuit of FIG. 5 is required and K is greater than N+2 bits then the K bit word is truncated to N+2 bits. This operation is represented at 104 in FIG. 5 but it will be appreciated that this truncation does not require any hardware. If the input K bit word is only N+2 bits then the truncation process is not necessary and the K bit word is applied to the input 106 of the summing circuit 108.

An error-concealing offset is generated in a manner which is described later and is added to the N+2 bit word in the summing circuit 108. The error-concealing offset is here a 3-bit value and the addition in this example therefore may overflow, resulting in a N+3 bit word. Although the circuit 108 is described as a summing circuit, any suitable form of circuit may be used to provide the desired output value as a function of the two input values.

The two LSBs of the N+3 bit word are ignored and the N+1 MSBs of the result value are applied to the limit circuit 118. This detects illegal out of range values which were caused by the summing process and substitutes the maximum legal value when necessary.

FIG. 6 shows one example of circuit that the limit circuit 118 can take. Here, the limit circuit is a multiplexer 172 which has one input 174 to receive the MSB, one input 176 to receive the remaining N bits and an input 180 for receiving an N bit value of the form 11111111. Where bit N is 1 then the multiplexer outputs the N bit word as 11111111. Where bit N is 0 then the output word N is formed by the N LSBs of the input word N+1.

The two LSBs of the N+3 bit word are applied to the error feedback register 120. If the clear signal from the control circuit 116 is inactive, indicating that error feedback is required, then the two LSBs from the error feedback register 120 are fed to the summing circuit 112 and added to a 2-bit dither value which is also applied to the summing circuit 112. The result of the summation will be either a 2-bit or a 3-bit value although for this particular operation it is assumed that the result of the addition of the summing circuit 112 overflows to produce a 3-bit value. Although the circuit 112 is described as a summing circuit, any suitable form of function generator may be used to provide the desired output value as a function of the two input values.

As will be appreciated, the 2-bit error value from the error feedback register 120 is formed by the stored two LSBs of the N+3 bit word from the summing circuit 108. The 2-bit error value is then added to the 2-bit dither value in the summing circuit 112 to form the error-concealing offset. The error-concealing offset is then added to the next following data value N+2 applied to the input 106 of the summing circuit 108.

Where the clear signal from the control circuit 116 is constantly active, error feedback from the error feedback register 120 is disabled. Ideally, the clear signal clears the register 120. If dither offset is applied to the summing circuit 108, in this example a 2-bit value may be used, although any suitable number of bits may be implemented to meet the design criteria of a particular implementation. In order for the control circuit 116 to produce the dither signal it needs to know the X, Y coordinate of each pixel or data value in the final image displayed on the screen, or at least the LSBs respectively of X and Y.

Figures 7, 8, 9:
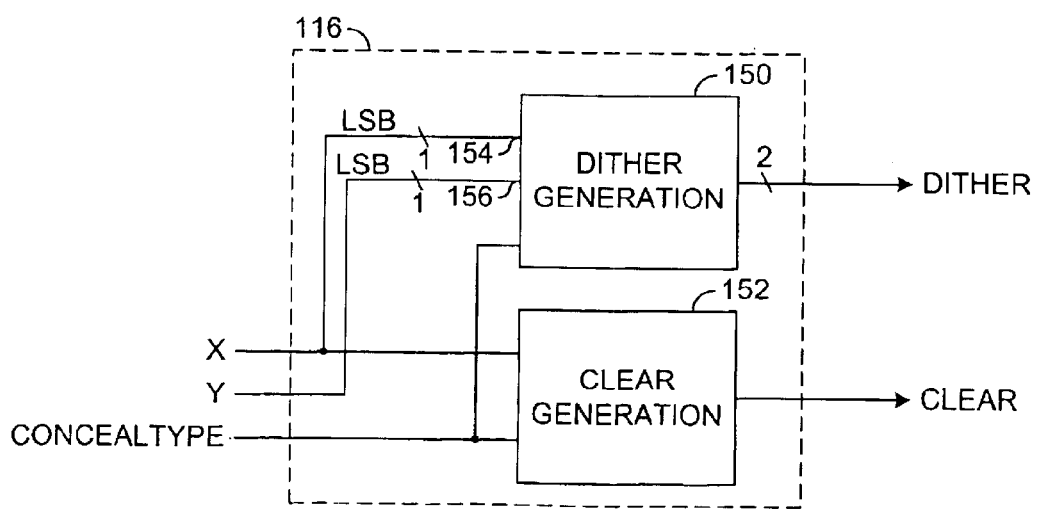
FIG. 7 is a table showing the relationship between the dither offset and the LSB of each pixel data number.
FIG. 8 is a representation of an array of pixels showing the dither offset for each pixel data number.
FIG. 9 is a schematic representation of one form of control circuit of the circuit of FIG. 5.

FIG. 7 is a table showing the dither offset which is generated using only the LSB X[0] and Y[0] of the X and Y coordinate values. As can be seen from FIG. 7, when the desired error concealment applied by the circuit 100 is truncation then the dither is fixed at 0. The 0 then ensures that no dither offset is generated by the dither source. If the desired error concealment applied by the circuit 100 is rounding then the dither offset is fixed at binary 10. The binary 10 is equivalent to half the maximum possible binary value of the two LSBs on the N bit output of the limit circuit 118. If the desired error concealment applied by the circuit 100 is dither then, as can be seen from the table of FIG. 7, where both the Y and X LSBs of the pixel coordinates are 0 then the dither offset is 01. For Y and X LSBs of 0 and 1 respectively then the dither offset is 10. For Y and X coordinate LSBs of 1 and 0 respectively the dither offset is 10 and for Y and X coordinate LSBs of 1 and 1 then the dither offset is 11.

FIG. 8 is similar to FIG. 4 and is a diagrammatic representation of an array of 16 pixels in a rectangular region of the screen display. The dither offset for each pixel which is applied by the circuit of FIG. 5 is shown in the rectangle representing that pixel and as can be seen the binary value of the dither offset alternates between 01 and 10 along the first and third lines and between 10 and 11 along the second and fourth lines.

The regular pattern of dither offset shown in FIG. 8 has an average value of binary added to the pixel display data. However, other arrangements are possible so long as the average value of the dither offset over the display area is equivalent to half the maximum value of the two LSBs of the N bit output word from the limit circuit 118.

As is mentioned above, in order for the control circuit 116 to produce the dither signal it needs to know the LSBs of the X, Y coordinate of each pixel or data value in the final image displayed on the screen, or at least the LSBs respectively of X and Y. The LSBs of the X, Y coordinate may be achieved in one of two ways.

FIG. 9 shows one example of the control circuit 116. The control circuit has a dither generation circuit 150 and a clear signal generation circuit 152. The dither generation circuit 150 is a set of logic gates with inputs 154, 156 each of which receives the LSB X[0] and Y[0] of the X and Y coordinate values respectively of the pixel data word K applied to the bit reduction circuit 100. The clear signal generation circuit 152 generates a "clear" signal when the X coordinate LSB is 0, or when the microprocessor (CPU) 40 applies a concealment type signal to the control circuit indicating error feedback is not required, and may be formed by a set of logic gates.

Figure 10:
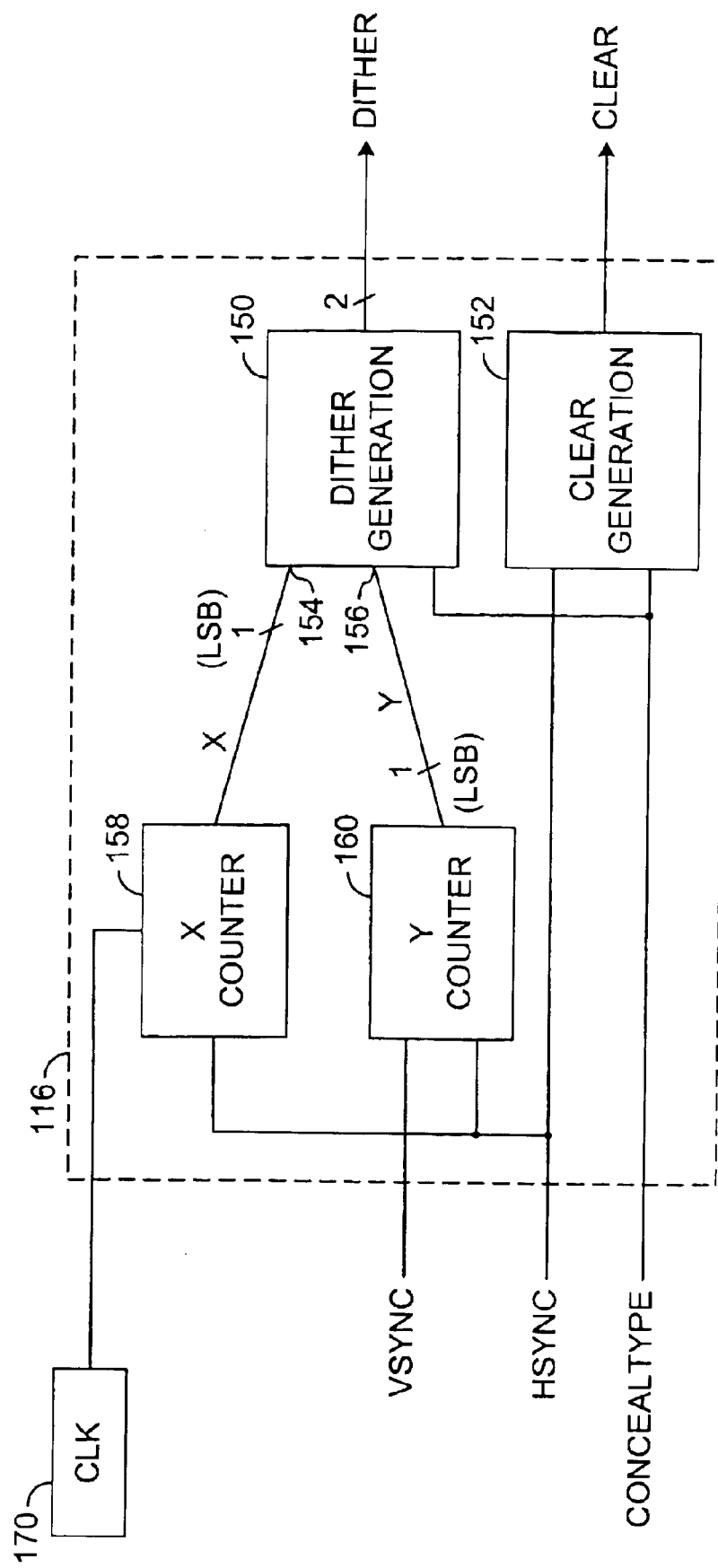
FIG. 10 is a schematic representation of a second form of control circuit for the circuit of FIG. 5.

FIG. 10 shows a second form of the control circuit 116 in which the dither generation is calculated by reference to the horizontal (HSync) and vertical (VSync) synchronisation signals. In FIG. 10, separate X and Y counters 158, 160 are provided and the respective outputs of each are applied to the inputs 154, 156 of the dither generation circuit 150. The HSync signal is applied to both counters 158, 160 whilst the VSync is applied to the Y counter 160. The X coordinate is incremented by a pixel clock 170, as a result of which the circuit 158 counts from an initial value, usually zero, for each successive pixel X coordinate. Each HSync pulse resets the circuit 158 between horizontal line scans when the X coordinate returns to its initial or base value and at the same time increments the Y counter 160 by one. The VSync signal resets the Y counter 160 between scanned fields of the image.

The X counter counts only through the X coordinates in response to the pixel clock pulses and applies the LSB of the X pixel coordinate to input 154 of the dither generation circuit 150. The Y coordinate is incremented at the end of each horizontal line by the HSync signal and the Y counter counts through the Y coordinates. The LSB of the HSync signal is applied to input 156 of the dither generation circuit 150. The latter then generates the dither offset value in accordance with the table of FIG. 7 and applies the dither signal to the input 114 of the summing circuit 112. It will be appreciated here that since both the X counter 158 and the Y counter 160 count through the pixel coordinates the dither generation circuit 150 can make use of more than one LSB from each, if desired.

Figure 11:
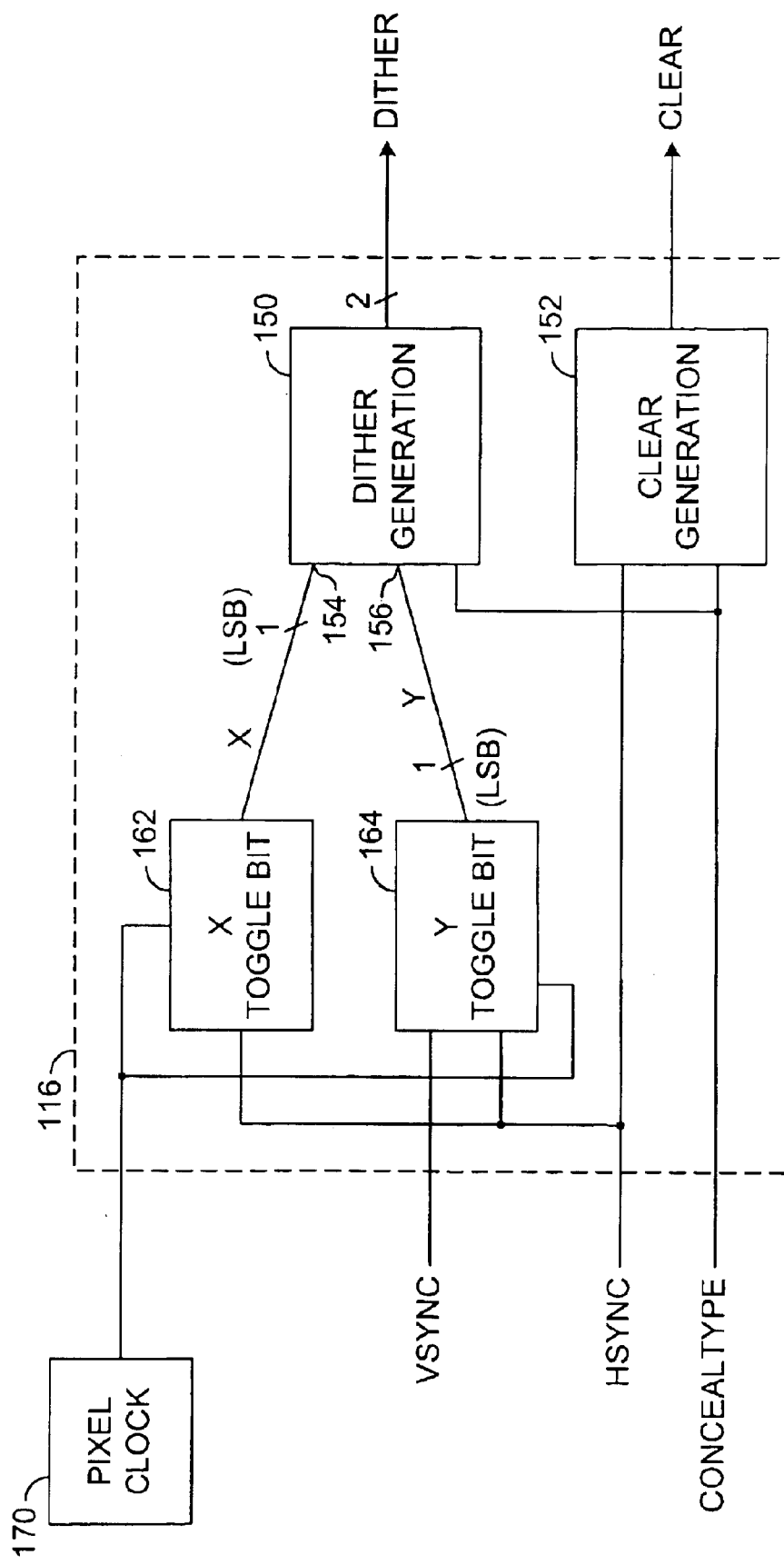
FIG. 11 is a schematic representation of a third form of control circuit for the circuit of FIG. 5.

FIG. 11 shows a circuit similar to FIG. 10 with the X and Y counters replaced by respective X and Y toggle bit circuits 162, 164. Each circuit is a single bit register which is toggled between 0 and 1, the bit representing the LSB of the X and Y pixel coordinates respectively. The X toggle bit circuit 162 is toggled between 0 and 1 by the pixel clock 170, as a result of which the circuit 162 toggles from one state (0 or 1) to its other state (1 or 0) for each successive pixel X coordinate. Each HSync pulse resets the X toggle bit circuit 162 between horizontal line scans when the X coordinate returns to its initial or base value and at the same time toggles the Y toggle bit circuit 164 from one state (0 or 1) to its other state (1 or 0). The VSync signal resets the Y toggle bit circuit 164 between scanned fields of the image. The circuit of FIG. 11 is useful where only one X and Y LSB is required for dither generation.

For the circuits of FIGS. 9, 10 and 11 the clear generation circuit 152 applies the clear signal to the error feedback register 120 either when the X coordinate LSB is 0 (FIG. 9) or a HSync pulse is received (FIGS. 9 and 10) or when the CPU applies the concealment type signal to the clear generation circuit 152 indicating that no error feedback is required, thus generating a permanent clear signal. In addition, the CPU 40 also applies the concealment type signal to the dither generation circuit 150. If dither offset is not to be used in the processing of a data word by the circuit 100 then the concealment type signal inhibits the generation of the dither offset signal from the dither generation circuit 150.

Figure 12:
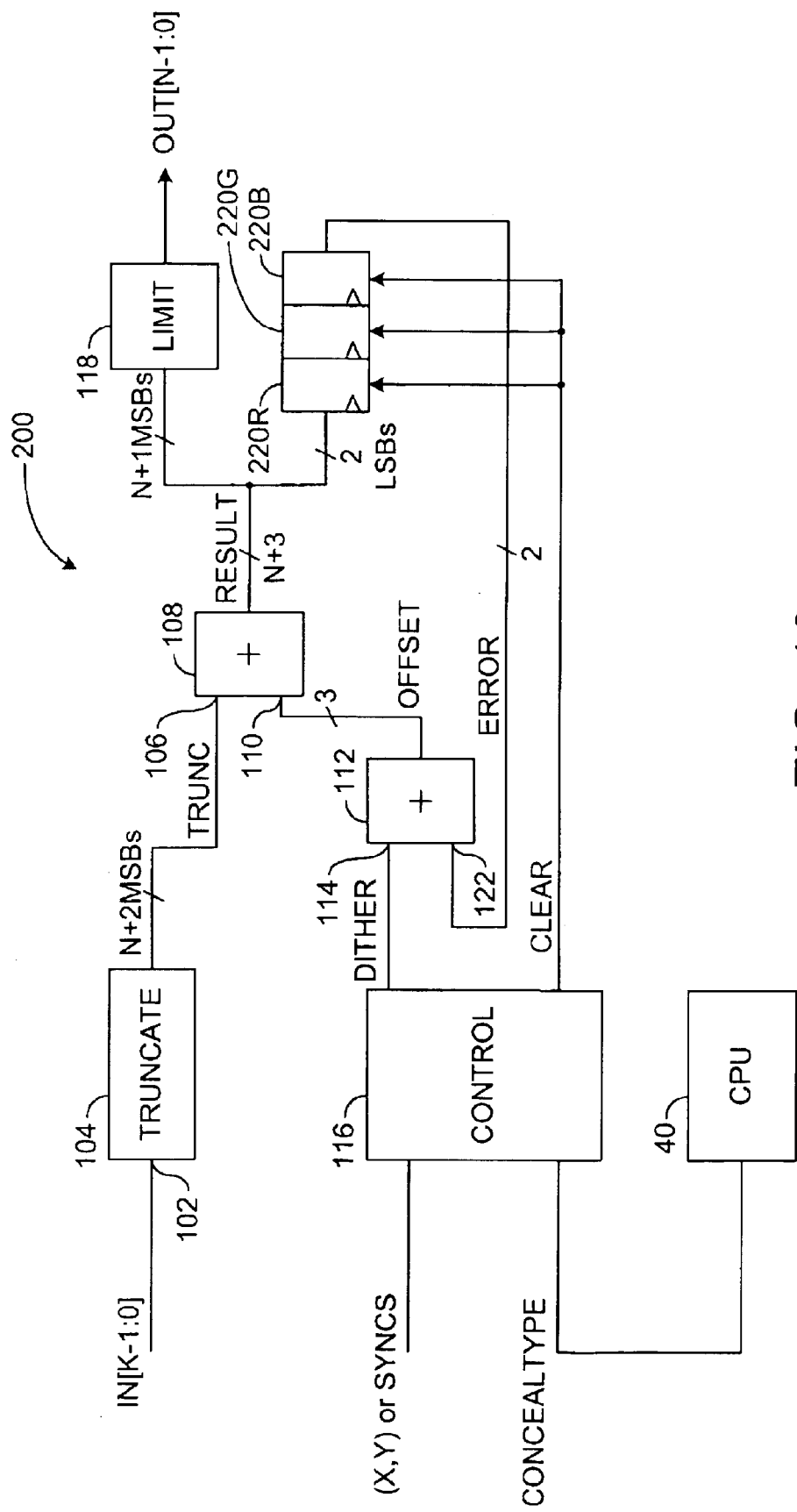
FIG. 12 is a circuit in accordance with an alternate embodiment of the present invention.

FIG. 12 shows a further bit reduction circuit 200 for use with multiplexed component data signals. The example circuit of FIG. 12 processes three data components in sequence although it will be appreciated that the number of components which are processed may be more or less than three. In this example, the circuit 200 processes three graphics components, for example Red, Green and Blue signals. The values for these components are applied to the truncation process 104 in sequence. If the K bit values for these three components Red, Green and Blue are represented by $K_R$, $K_G$ and $K_B$ then the components are fed to the circuit 200 in the sequence:

$K_R K_G K_B K_R K_G K_B K_R K_G K_B K_R K_G K_B$ ...

The circuit 200 is similar to the circuit 100 of FIG. 5 with the exception that the error feedback register 120 is replaced by three sets of error feedback registers 220R, 220G and 220B. Three sets of registers are necessary to ensure that the error value from one Red signal $K_R$ is added through the summing circuits 112 and 108 to the next Red signal KR and not to a Blue or a Green data signal. This also applies to the error value for the Green and Blue pixels. Where the circuit is used to process multiplexed component data where there are two or more than three components then it will be appreciated that a respective register 220 is provided for each component.

While the invention has been particularly shown and described with reference to the preferred embodiments thereof, it will be understood by those skilled in the art that various changes in form and details may be made without departing from the spirit and scope of the invention.

What is claimed is:

1. A circuit for reducing the number of bits in a data value, the circuit comprising:
   a first summing circuit configured to add an error offset value and one or more most significant bits (MSBs) of said bit data value to produce a result data value;
   a control circuit configured to generate a dither offset value;
   an error feedback circuit configured to receive one or more least significant bits (LSBs) of said result data value and generate an error value dependent on said LSBs;
   a second summing circuit configured to add said dither offset value and said error value to provide said error offset value; and
   a processor configured to selectively control generation of said dither offset value and said error value.

2. The circuit according to claim 1, wherein said data value is representative of a pixel data for display on a video display screen.

3. The circuit according to claim 2, wherein said control circuit comprises:
   a dither generating circuit configured to generate said dither offset value in response to the LSBs of each of a first and second coordinates of said pixel data represented by said data value.

4. The circuit according to claim 3, wherein:
   said dither generating circuit comprises first and second inputs; and
   said control circuit comprises:
       a first coordinate counter for counting through said first coordinates from a first initial value and applying the LSBs of each said first coordinates to said first input of said dither generating circuit; and
       a second coordinate counter for counting through said second coordinates from a second initial value and applying the LSBs of each said second coordinates to said second input of said dither generating circuit, wherein each of said first and second coordinate counters comprises a reset input for resetting to said first and second initial values in response to receipt of a respective reset signal.

5. The circuit according to claim 4, wherein:
   said first counter reset signal comprises a horizontal synchronization signal; and
   said second counter reset signal comprises a vertical synchronization signal.

6. The circuit according to claim 5, wherein said horizontal synchronization signal is further configured to increment said second coordinate counter.

7. The circuit according to claim 1, wherein said processor is further configured to generate a preselected concealment type signal for controlling generation of said dither offset value and said error value.

8. The circuit according to claim 7, wherein said control circuit further comprises:
   a dither offset generating circuit operable to generate said dither offset value in dependence on said preselected concealment type signal; and
   an inhibit circuit for inhibiting said error value in response to said preselected concealment type signal.

9. The circuit according to claim 1, further comprising:
   a truncation circuit for truncating said data value to a predetermined bit value and applying said predetermined bit value to said first summing circuit.

10. The circuit according to claim 1, further comprising:
    a limit circuit for receiving a first set of most significant bits (MSBs) from said first summing circuit and generating a bit output of a value in response to the value of the MSB of said first MSBs.

11. A method of applying error concealment to the reduction of a data value, comprising the steps of:
    (A) receiving a series of successive data values;
    (B) generating a respective error offset value for each of said data values; and
    (C) adding each of said error offset values to a one or more most significant bits (MSBs) of the next following data value to produce a respective result value, wherein step (B) further comprises the sub-steps of (B-1) generating a dither offset value for each of said data values, (B-2) generating an error value from one or more least significant bits (LSBs) of the previous result value, and (B-3) summing said dither offset value and said error value to produce said error offset value.

12. The method according to claim 11, wherein said data value is representative of a pixel data for display on a video display screen.

13. The method according to claim 12, wherein step (B) further comprises:
    generating said dither offset value in response to the LSBs of each of a first and a second coordinate of said pixel data represented by said data value.

14. The method according to claim 13, wherein said dither offset value is a function of the LSBs of each said first and second coordinate of said pixel data.

15. The method according to claim 14, wherein step (B) further comprises:

counting through said first coordinates from a first initial value;

counting through said second coordinates from a second initial value; and generating said dither offset values in response to the LSBs of each said first and second coordinates.

16. The method according to claim 15, wherein:

said first coordinate is reset by a horizontal synchronization signal;

said second coordinate is reset by a vertical synchronization signal.

17. The method according to claim 11, wherein step (B) further comprises:

generating a preselected concealment type signal for controlling generation of said dither offset value and said error value.

18. The method according to claim 11, wherein step (C) further comprises:

generating a bit output of a value dependent on the value of the MSB of said result value.

19. The method according to claim 11, wherein step (B) further comprises:

generating a concealment type signal; and generating said dither offset value in dependence on said concealment type signal.

* * * * *